United States Patent
Onomura

(10) Patent No.: US 10,176,394 B2
(45) Date of Patent: Jan. 8, 2019

(54) SEARCH ASSISTING APPARATUS, SEARCH ASSISTING METHOD, AND COMPUTER READABLE MEDIUM

(71) Applicant: SUBARU CORPORATION, Tokyo (JP)

(72) Inventor: Yoichi Onomura, Tokyo (JP)

(73) Assignee: Subaru Corporation, Tokyo (JP)

( * ) Notice: Subject to any disclaimer, the term of this patent is extended or adjusted under 35 U.S.C. 154(b) by 0 days.

(21) Appl. No.: 15/461,749

(22) Filed: Mar. 17, 2017

(65) Prior Publication Data

US 2017/0270383 A1 Sep. 21, 2017

(30) Foreign Application Priority Data

Mar. 18, 2016 (JP) ................. 2016-055165

(51) Int. Cl.
| | |
|---|---|
| G06K 9/00 | (2006.01) |
| G06K 9/20 | (2006.01) |
| G06T 7/73 | (2017.01) |
| G06F 3/01 | (2006.01) |
| G06F 3/03 | (2006.01) |
| G06F 3/0484 | (2013.01) |
| B64D 47/08 | (2006.01) |

(52) U.S. Cl.
CPC ........... *G06K 9/2081* (2013.01); *G06F 3/013* (2013.01); *G06F 3/0304* (2013.01); *G06F 3/04842* (2013.01); *G06K 9/0063* (2013.01); *G06K 9/00604* (2013.01); *G06T 7/74* (2017.01); *B64D 47/08* (2013.01); *G06T 2207/10032* (2013.01); *G06T 2207/20104* (2013.01); *G06T 2207/30201* (2013.01); *G06T 2207/30241* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 2009/0022368 A1* | 1/2009 | Matsuoka | ............... | B60K 35/00 382/103 |
| 2011/0141010 A1* | 6/2011 | Sakata | ................... | A61B 3/113 345/156 |
| 2014/0055342 A1* | 2/2014 | Kamimura | .............. | G06F 3/013 345/156 |

(Continued)

FOREIGN PATENT DOCUMENTS

| | | | |
|---|---|---|---|
| JP | 07-081695 | * | 9/1993 |
| JP | 4170488 B2 | | 10/2008 |

*Primary Examiner* — Delomia L Gilliard
(74) *Attorney, Agent, or Firm* — McDermott Will & Emery, LLP

(57) ABSTRACT

A search assisting apparatus includes a line-of-sight trajectory detector, a gaze region extractor, and a target presence determiner. The line-of-sight trajectory detector that detects a line-of-sight trajectory of the operator on an image displayed on a display. The gaze region extractor that extracts, on a basis of the line-of-sight trajectory detected by the line-of-sight trajectory detector, a gaze region gazed by the operator in the image displayed on the display. The target presence determiner that determines, on a basis of a distance from a predetermined position, presence of a predetermined detection target in the gaze region.

8 Claims, 3 Drawing Sheets

(56) References Cited

U.S. PATENT DOCUMENTS

| | | | |
|---|---|---|---|
| 2015/0002392 A1* | 1/2015 | Kempinski | A61B 3/113 345/156 |
| 2016/0095511 A1* | 4/2016 | Taguchi | A61B 3/0025 351/209 |
| 2018/0007255 A1* | 1/2018 | Tang | H04N 5/23212 |
| 2018/0061116 A1* | 3/2018 | Mitchell | G06T 15/20 |

* cited by examiner

SEARCH ASSISTING APPARATUS, SEARCH ASSISTING METHOD, AND COMPUTER READABLE MEDIUM

CROSS-REFERENCE TO RELATED APPLICATIONS

The present application claims priority from Japanese Patent Application No. 2016-055165 filed on Mar. 18, 2016, the entire contents of which are hereby incorporated by reference.

BACKGROUND

The technology relates to a technique that assists searching of a predetermined detection target. The searching may be performed by an operator of a camera while the operator sees a picture obtained from a height by the camera. In particular, the technology relates to a technique that is useful in reducing an operation burden imposed on the operator upon the searching.

Searching of a predetermined detection target may be performed while an operator who uses an optical camera sees a picture or an image obtained from a height by the optical camera. The predetermined detection target may be on the ground or at the sea. The optical camera may be mounted on an aircraft, etc. For example, reference is made to Japanese Patent No. 4170488.

SUMMARY

Upon a searching activity of a predetermined detection target, an operator performs searching over a wide range while seeing a camera-obtained picture based on a wide angle of view. When a suspicious object is found, the operator turns a visual axis of the camera in a direction in which the suspicious object is found, and switches the camera from the wide angle of view to a narrow angle of view, i.e., performs zooming in, to confirm whether the suspicious object is a detection target. The operator returns the camera to the wide angle of view again to continue performing the searching when the object is not the detection target. When the object is the detection target, the operator performs an orientation of an actual position or actual coordinates of the detection target, on the basis of a position of the detection target in the image.

Accordingly, it is necessary for the operator to repeatedly perform the searching based on the wide angle of view and identification based on the narrow angle of view until the detection target is found, posing a significant operation burden on the operator.

It is desirable to reduce an operation burden imposed on an operator upon searching of a detection target performed by the operator while the operator sees a captured image.

An aspect of the technology provides a search assisting apparatus including: a line-of-sight trajectory detector that detects a line-of-sight trajectory of the operator on an image displayed on a display; a gaze region extractor that extracts, on a basis of the line-of-sight trajectory detected by the line-of-sight trajectory detector, a gaze region gazed by the operator in the image displayed on the display; a target presence determiner that determines, on a basis of a distance from a predetermined position, presence of a predetermined detection target in the gaze region.

The capturing unit may further includes a stereo camera that is capable of obtaining information on the distance from the predetermined position and outputting the information to the target presence determiner.

The gaze region extractor may extract, from the image displayed on the display, a circular region as the gaze region. The circular region may be a region in which an average position of the line-of-sight trajectory is defined as center and in which probability of presence of the line-of-sight trajectory takes a predetermined value.

The target presence determiner may determine that the detection target is present in the gaze region, when a difference between an average value of the distance in the gaze region from the capturing unit and a distance nearest in the gaze region from the capturing unit is equal to or greater than a predetermined value, and may perform orientation of the detection target, by defining a position of the distance that is the nearest in the gaze region from the capturing unit as a position of the detection target.

The stereo camera may be mounted on an aircraft.

An aspect of the technology provides a search assisting method including: detecting a line-of-sight trajectory of the operator on an image displayed on a display; extracting, on a basis of the line-of-sight trajectory detected by the detecting of the line-of-sight trajectory, a gaze region gazed by the operator in the image displayed on the display; determining, on a basis of a distance from a predetermined position measured by the measuring of the distance, presence of a predetermined detection target in the gaze region.

An aspect of the technology provides a non-transitory computer readable medium having a search assisting program. The search assisting program causes, when executed by a search assisting apparatus that includes a display that displays an image captured by the capturing unit and a ranging unit that measures a distance from the capturing unit, the search assisting apparatus to: detect a line-of-sight trajectory of an operator on an image displayed on a display that displays an image captured by a capturing unit; extract, on a basis of the detected line-of-sight trajectory, a gaze region gazed by the operator in the image displayed on the display; and determine, on a basis of the distance in the gaze region from a predetermined position measured by a ranging unit that measures a distance from the capturing unit, presence of the detection target in the gaze region.

An aspect of the technology provides a search assisting apparatus comprising circuitry configured to detect a line-of-sight trajectory of the operator on an image displayed on a display, extract, on a basis of the line-of-sight trajectory detected by the detection of the line-of-sight trajectory, a gaze region gazed by the operator in the image displayed on the display, and determine, on a basis of a distance in the gaze region from a predetermined position, presence of a predetermined detection target in the gaze region.

DETAILED DESCRIPTION

In the following, a description is given of one implementation of the technology with reference to the accompanying drawings. The following non-limiting implementation is based on an example in which a search assisting apparatus according to one implementation of the technology is applied to an aircraft 1.

[Configuration]

Figure 1:
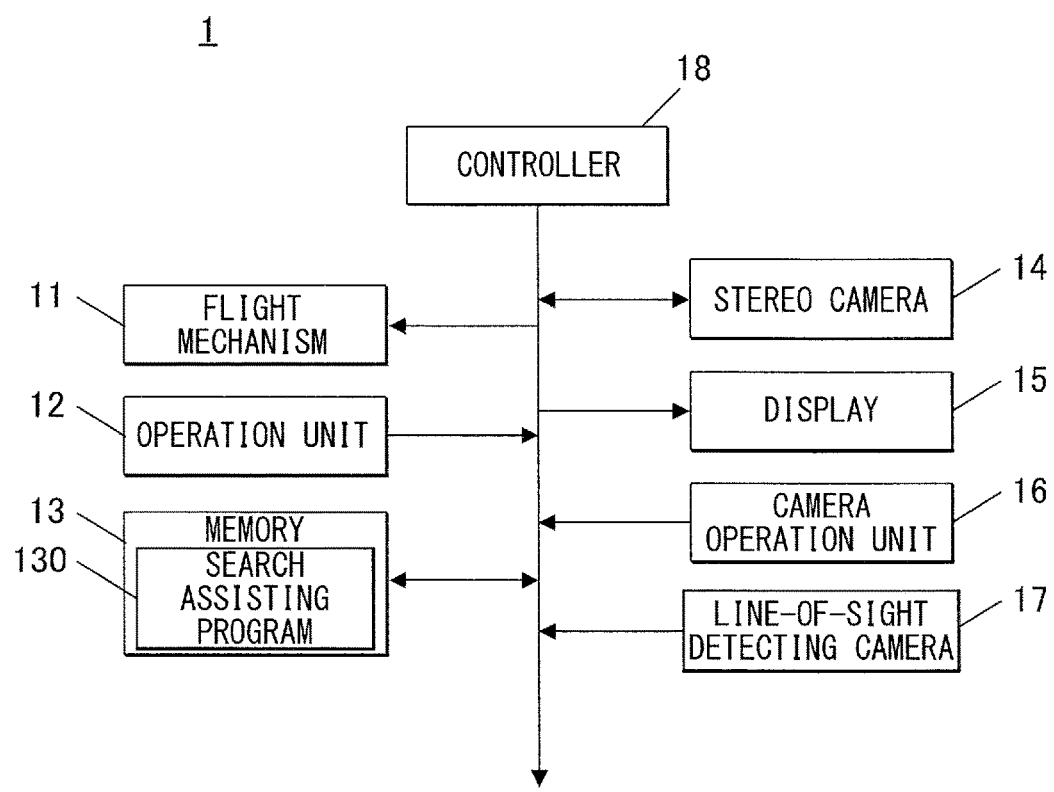
FIG. 1 is a block diagram illustrating an outline configuration of an aircraft that includes a search assisting apparatus according to one implementation of the technology.

First, a description is given of a configuration of the aircraft 1 according to one implementation with reference to FIG. 1.

FIG. 1 is a block diagram illustrating an outline configuration of the aircraft 1. The aircraft 1 may be directed to searching of a predetermined detection target. More specifically, the aircraft 1 is provided with the search assisting apparatus according to one implementation of the technology, whereby the aircraft 1 is able to assist the searching of the detection target. The searching is performed by an operator (or a crew) in the aircraft 1 with use of a stereo camera 14 mounted on the aircraft 1.

Referring to FIG. 1, the aircraft 1 may include a flight mechanism 11, an operation unit 12, a memory 13, the stereo camera 14, a display 15, a camera operation unit 16, a line-of-sight detecting camera 17, and a controller 18.

The flight mechanism 11 may be a mechanism that causes the aircraft 1 to fly. The flight mechanism 11 may have members such as an internal-combustion mechanism that generates propulsion and a control surface actuator. For example, the internal-combustion mechanism may be a jet engine. In one implementation, the operation unit 12, the memory 13, the stereo camera 14, the display 15, the camera operation unit 16, the line-of-sight detecting camera 17, and the controller 18 may serve as a "search assisting apparatus".

The operation unit 12 may include members such as a control stick operated by a pilot and various operation keys. The operation unit 12 may output, to the controller 18, a signal that corresponds to an operation state of the members including the control stick and the various operation keys.

The memory 13 may store programs and pieces of data directed to execution of various functions of the aircraft 1, and may also serve as a work area. In the present implementation, the memory 13 may store a search assisting program 130.

The search assisting program 130 may be a program that causes the controller 18 to execute a later-described search assisting processing.

The stereo camera 14 may capture an image outside the aircraft 1. The stereo camera 14 may be provided on a body of the aircraft 1. Specifically, the stereo camera 14 may be placed on an unillustrated gimbal so that a facing direction of the stereo camera 14 is varied. The stereo camera 14 may capture images of an object from different directions at the same time and thus obtain information on a depth direction of the object as well. In other words, the stereo camera 14 may also obtain, as distance information, information on a distance from the stereo camera 14. The stereo camera 14 may output the thus-obtained information to the controller 18.

The display 15 may display the image captured by the stereo camera 14, on the basis of a display signal received from the controller 18.

The camera operation unit 16 may be directed to operation of the stereo camera 14. The camera operation unit 16 may allow for operations such as varying the facing direction of the stereo camera 14, performing zooming in of the stereo camera 14, and performing zooming out of the stereo camera 14. In the present implementation, the camera operation unit 16 may be operated by a dedicated operator who is different from the pilot. In an alternative implementation, however, the pilot may operate the camera operation unit 16.

The operator may operate the camera operation unit 16 while seeing, with the display 15, the image captured by the stereo camera 14.

The line-of-sight detecting camera 17 may detect a line-of-sight (or an eye movement) of the operator who sees the display 15. The line-of-sight detecting camera 17 may be so provided as to face the face of the operator. The line-of-sight detecting camera 17 may capture the eye movement of the operator, and output image information on the eye movement to the controller 18.

In one implementation, the line-of-sight detecting camera 17 may be provided integrally with the display 15.

The controller 18 may centrally control each part of the aircraft 1. For example, the controller 18 may control driving of the flight mechanism 11 to control flight of the aircraft 1, and expand a program stored in the memory 13 to execute various processes in association with the expanded program.

Figure 2:
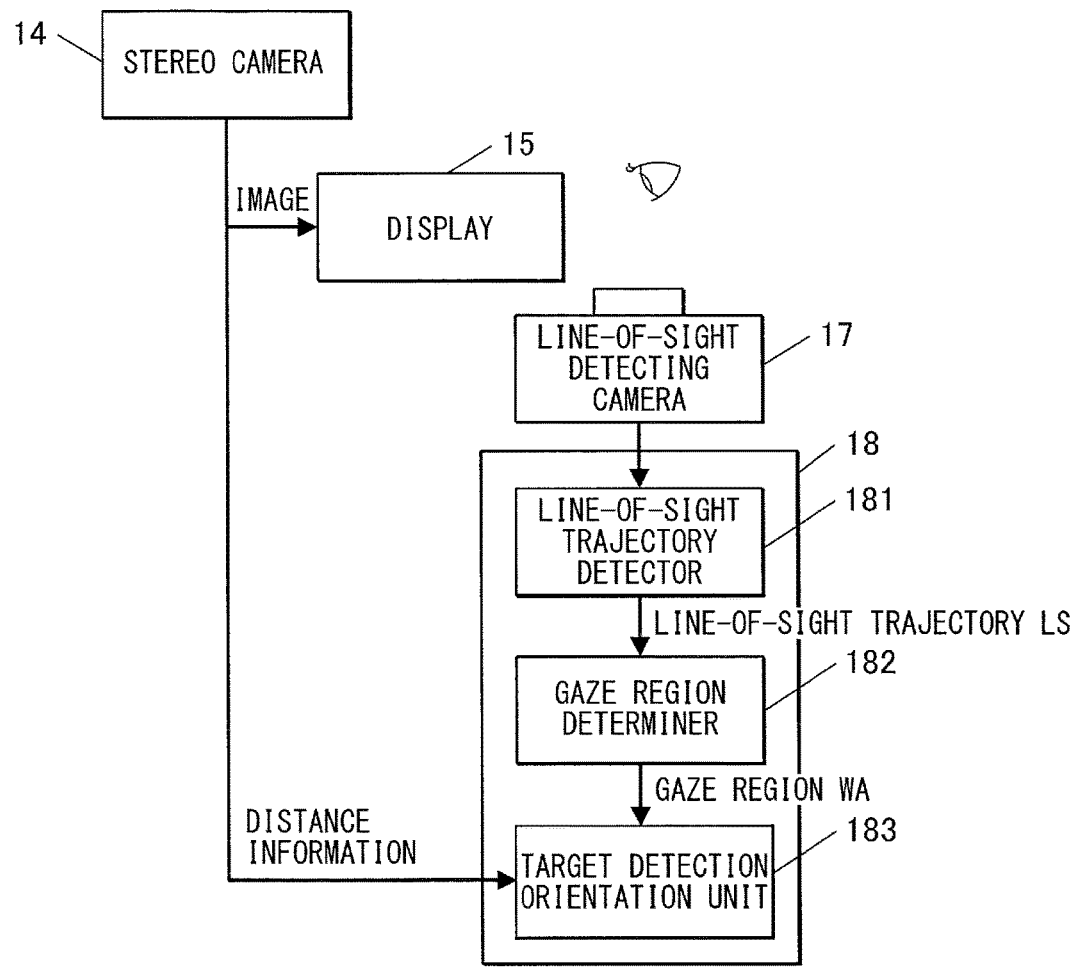
FIG. 2 is a data flowchart illustrating an example of a flow of data in a search assisting processing.

Further, as described later in greater detail, the controller 18 may include a line-of-sight trajectory detector 181, a gaze region determiner 182, and a target detection orientation unit 183 as illustrated in FIG. 2 which serve as various functional units directed to the search assisting processing. In one implementation, the line-of-sight trajectory detector 181, the gaze region determiner 182, and the target detection orientation unit 183 may respectively serve as a "line-of-sight trajectory detector", a "gaze region extractor", and a "target presence determiner".

[Workings]

A description is given next of workings of the aircraft 1 upon executing the search assisting processing.

Figure 3A:
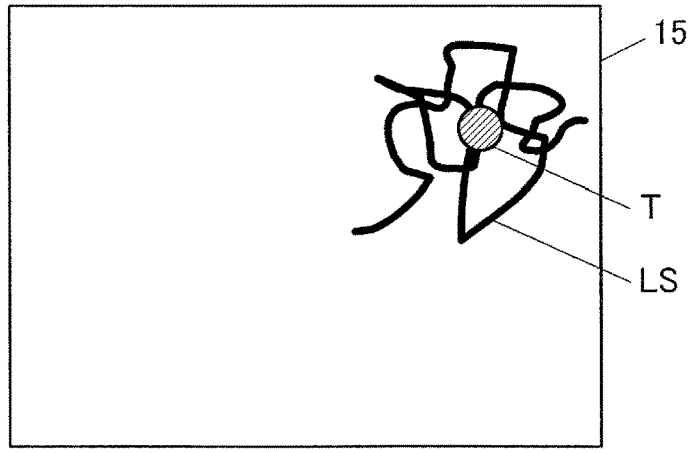
FIGS. 3A to 3C each describe the search assisting processing.
Figure 3B:
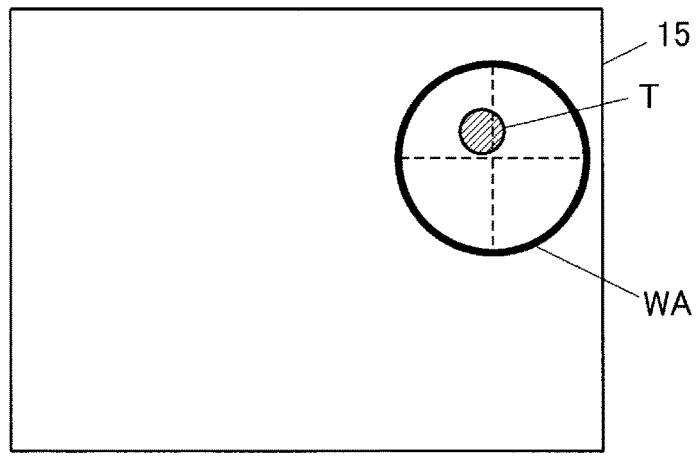
Figure 3C:
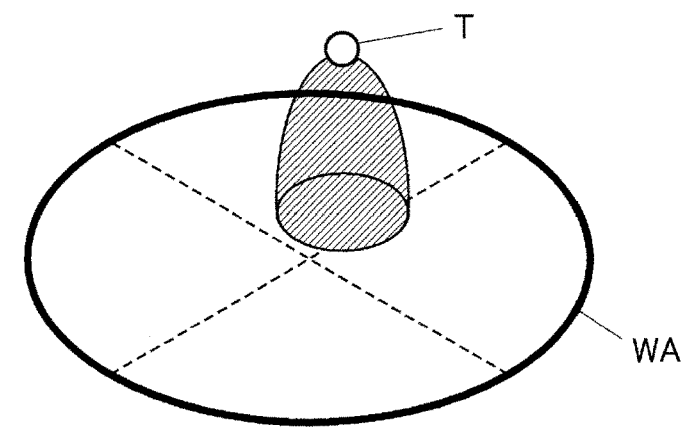

FIG. 2 is a data flowchart illustrating an example of a flow of data in the search assisting processing. FIGS. 3A to 3C each describe the search assisting processing, in which FIG. 3A illustrates a later-described line-of-sight trajectory LS on the display 15, FIG. 3B illustrates a later-described gaze region WA on the display 15, and FIG. 3C is an imaginary diagram illustrating a detection target T in the gaze region WA.

The search assisting processing may assist the searching of the detection target T performed by the operator while the operator sees the image captured by the stereo camera 14. For example, the search assisting processing may be executed in response to an input of instructions directed to the execution of the search assisting processing. The input of the instructions may be based on an operation performed by the operator. Upon receiving the input of the instructions, the controller 18 may read the search assisting program 130 from the memory 13 and expand the search assisting program 130 to execute the search assisting processing.

Note that FIGS. 2 to 3C illustrate an example in which an image of the ground, the sea, and/or the air below the aircraft 1 is captured from the flying aircraft 1 by the stereo camera 14, and the captured image is displayed on the display 15. In the illustrated example, the detection target T (or the possible detection target T) is included in the image displayed on the display 15 as a result of performing the capturing based on a wide angle of view by the stereo camera 14 as illustrated in FIG. 3A.

Referring to FIG. 2, when the search assisting processing is executed, the controller 18 may first capture, with the line-of-sight detecting camera 17, the eye movement of the operator who sees the display 15, and detect, with the line-of-sight trajectory detector 181, the line-of-sight trajectory LS of the operator on the basis of the image information on the eye movement.

In one specific but non-limiting example, the line-of-sight trajectory detector 181 may detect the line-of-sight of the operator on the basis of a positional relationship between a reference point and a moving point. For example, the reference point and the moving point may respectively be a corneal reflex and a pupil. Alternatively, the reference point and the moving point may respectively be an eye corner and an iris. The line-of-sight trajectory detector 181 may store a movement over a predetermined time period of the line-of-sight, to thereby detect the line-of-sight trajectory LS of the operator on the image displayed on the display 15. For example, the time period may be seconds.

This configuration obtains the line-of-sight trajectory LS that goes back and forth around the detection target T (or the possible detection target T) on the image displayed on the display 15 as illustrated in FIG. 3A in an attempt of the operator to determine authenticity of the detection target T (or the possible detection target T).

Thereafter, the controller 18 may extract, with the gaze region determiner 182, the gaze region WA on the basis of the thus-detected line-of-sight trajectory LS. The gaze region WA may be a region gazed by the operator in the image displayed on the display 15.

In one specific but non-limiting example, the gaze region determiner 182 may determine, as the gaze region WA, a circular region in which an average position of the line-of-sight trajectory LS is defined as the center and in which probability of presence of the line-of-sight trajectory LS takes a predetermined value as illustrated in FIG. 3B. For example, when determining a region in which the probability of presence of the line-of-sight trajectory LS is 50%, the gaze region determiner 182 may determine, as the gaze region WA, a circular region in which a value of a radius corresponds to a value of a circular error probability (CEP).

This configuration extracts, from the image displayed on the display 15, the region gazed by the operator which includes the detection target T (or the possible detection target T), as the gaze region WA.

Thereafter, with the target detection orientation unit 183, the controller 18 may make a determination as to whether the detection target T is present in the gaze region WA on the basis of the distance in the thus-extracted gaze region WA from the stereo camera 14, and may perform orientation of a position of the detection target T when the detection target T is determined as being present in the gaze region WA.

In one specific but non-limiting example, the target detection orientation unit 183 may determine that the detection target T is present in the gaze region WA when a difference between an average value of the distance and a nearest distance is equal to or greater than a predetermined value. The average value may be an average of the distance in the gaze region WA (or in the gaze region WA as a whole) from the stereo camera 14. The nearest distance may be a distance that is nearest in the gaze region WA from the stereo camera 14. Note that a value of any distance from the stereo camera 14 may be acquired directly on the basis of the distance information obtained by the stereo camera 14, without depending on any other device.

When the determination is made that the detection target T is present in the gaze region WA, the target detection orientation unit 183 may perform the orientation, by defining a position of the distance that is the nearest in the gaze region WA from the stereo camera 14, i.e., a position that is highest in the gaze region WA, as the position of the detection target T as illustrated in FIG. 3C.

The controller 18 may continuously repeat the detection of the line-of-sight trajectory LS, the extraction of the gaze region WA, the determination on the presence of the detection target T, and the orientation of the detection target T, until the orientation of the position of the detection target T is successful.

[Effects]

According to the present implementation, the gaze region WA gazed by the operator is extracted from the image displayed on the display 15, on the basis of the line-of-sight trajectory LS of the operator on the image displayed on the display 15. Further, the determination is made as to whether the detection target T is present in the gaze region WA, on the basis of the distance in the gaze region WA from the stereo camera 14.

In other words, when the operator gazes the image displayed on the display 15, the determination is made as to whether an object possibly identifiable as the detection target T is present in the gaze region WA, and the determination is made as to whether the object is the detection target T on the basis of the distance from the stereo camera 14 on a condition that the object possibly identifiable as the detection target T is determined as being present in the gaze region WA. Thus, the presence of the detection target T is confirmed automatically only by the operator's action of searching for the detection target T (i.e., tracking the detection target T with his/her eyes) within the image displayed on the display 15.

Hence, it is possible to reduce an operation burden imposed on the operator as compared with an example case in which the operator is required to repeatedly perform searching based on a wide angle of view and identification based on a narrow angle of view.

Further, the stereo camera 14 able to obtain the distance information, serving as the information on the distance from the stereo camera 14, may be used as a capturing unit that captures the image. Hence, it is not necessarily required to separately provide a ranging unit that is directed solely for the measurement of the distance.

[Modification Examples]

Although some implementations of the technology have been described in the foregoing, the technology is not limited to those implementations, and may be modified in a wide variety of ways as needed without departing from the scope as defined by the appended claims.

For example, in the foregoing implementation, the determination is made as to whether the detection target T is present in the gaze region WA, on the basis of the difference between the average value of the distance in the gaze region WA from the stereo camera 14 and the nearest distance in the gaze region WA from the stereo camera 14. In one implementation, the stereo camera 14 may serve as a "capturing unit". In an alternative implementation, however, a range of the detection target T itself may be taken into consideration to exclude values corresponding to the range of the detection target T from the average value of the distance in the gaze region WA.

More specifically, in such an alternative implementation, an average value of the distance in a part of the gaze region WA from the stereo camera 14 may be used in place of "the average value of the distance in the gaze region WA from the stereo camera 14". The part of the gaze region WA may be a part of the gaze region WA from which a range corresponding to a predetermined radius from a position that is the nearest to the stereo camera 14 is excluded.

Further, in the foregoing implementation, the determination as to whether the detection target T is present in the gaze region WA is made on the basis of the distance from the stereo camera 14. In an alternative implementation, however, the presence of the detection target T may be determined on the basis of an altitude, in consideration of the "distance from the stereo camera 14" which is, in other words, substantially the altitude.

More specifically, in such an alternative implementation, a configuration may be employed in which a database related to information on the altitude in a search range may be stored in advance in the memory 13, or in which making reference to the database by a device such as a communicator is made possible. In this alternative implementation, the distance from the stereo camera 14 may be converted into the altitude to make reference to the database related to the information on the altitude. When a value of the altitude of the detection target T (or the possible detection target T) converted from the distance corresponds to a value of the altitude included in the database, a position of that altitude corresponding to the altitude in the database may be determined as the position of the detection target T (or the possible detection target T).

Further, in the foregoing implementation, the stereo camera 14 is used to obtain information on the image, i.e., image information, which includes the distance information. In an alternative implementation, however, a capturing unit that obtains the image information without the distance information may be used. In such an alternative implementation, the distance information may be obtained from a separate ranging unit such as an optical sensor and a radar device. The capturing unit in the alternative implementation may be a monocular camera. After the gaze region WA is extracted from the image displayed on the display 15, irradiation of laser or a radio wave may be performed on the gaze region WA by the ranging unit to measure the distance in the gaze region WA from the aircraft 1.

Further, in the foregoing implementation, the operator on the aircraft 1 performs the searching of the detection target T. In an alternative implementation, however, the operator may be at any location other than the aircraft 1 as long as the stereo camera 14 is mounted on the aircraft 1 to be able to capture the image from a height. In such an alternative implementation, devices other than the stereo camera 14, namely such as the display 15, the camera operation unit 16, and the line-of-sight detecting camera 17, may be located, together with the operator, at any location other than the aircraft 1. Non-limiting examples of the location other than the aircraft 1 may include a facility on the ground. In other words, the operator at the ground facility or any other location may perform the searching on the basis of the image information transmitted from the stereo camera 14 mounted on the aircraft 1.

Further, in the foregoing implementation, the stereo camera 14 is mounted on the aircraft 1. However, it is not necessary for the stereo camera 14 to be mounted on the aircraft 1 as long as the stereo camera 14 is located at a high place and thus able to capture an image of the ground, the sea, and/or the air. In an alternative implementation, the stereo camera 14 may be located on an upper part of a high building, or may be mounted on an unmanned aerial vehicle (UAV). As used herein, the term "aircraft" may encompass the unmanned aerial vehicle.

In one implementation described above, the controller 18 may include a semiconductor integrated circuit that may have devices such as, but not limited to, the central processing unit (CPU), the ROM, and the RAM. In an alternative implementation, the controller 18 may include an integrated circuit such as, but not limited to, a field programmable gate array (FPGA) and an application specific integrated circuit (ASIC). The controller 18 or any other controller may include one or more central processing units, one or more FPGAs, and/or one or more ASICs.

The implementation also provides a program as the search assisting program 130 that causes a computer to function as the controller 18, and a recording medium that stores the program. The recording medium is computer readable. Non-limiting examples of the recording medium may include a flexible disk, a magneto-optical disk, ROM, CD, DVD (Registered Trademark), and BD (Registered Trademark). As used herein, the term "program" may refer to a data processor written in any language and any description method.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A search assisting apparatus comprising:
   a controller; and
   a memory storing instructions that, when executed by the controller, cause the controller to:
   detect a line-of-sight trajectory of an operator on an image displayed on a display;
   extracting, on a basis of the line-of-sight trajectory detected, a gaze region gazed by the operator in the image displayed on the display; and
   determine, on a basis of a distance from a predetermined position, a presence of a predetermined detection target in the gaze region,
   wherein extracting the gaze region comprises extracting, from the image displayed on the display, a circular region as the gaze region, the circular region being a region in which an average position of the line-of-sight trajectory is defined as a center and in which probability of presence of the line-of-sight trajectory takes a predetermined value.

2. The search assisting apparatus according to claim 1, further comprising a stereo camera obtaining information on the distance from the predetermined.

3. The search assisting apparatus according to claim 2, wherein determining the gaze region comprises extracting, from the image displayed on the display, a circular region as the gaze region, the circular region being a region in which an average position of the line-of-sight trajectory is defined as a center and in which probability of presence of the line-of-sight trajectory takes a predetermined value.

4. The search assisting apparatus according to claim 1, wherein
   the presence of the predetermined detection target in the gaze region is determined when a difference between an average value of the distance in the gaze region from a capturing unit and a distance nearest in the gaze region from the capturing unit is equal to or greater than a predetermined value, and
   orientation of the detection target is performed, by defining a position of the distance that is the nearest in the gaze region from the capturing unit as a position of the detection target.

5. The search assisting apparatus according to claim 2, wherein the presence of the predetermined detection target in the gaze region is determined when a difference between an average value of the distance in the gaze region from the stereo camera and a distance nearest in the gaze region from the stereo camera is equal to or greater than a predetermined value, and performs orientation of the detection target, by defining a position of the distance that is the nearest in the gaze region from the stereo camera as a position of the detection target.

6. The search assisting apparatus according to claim 2, wherein the stereo camera is mounted on an aircraft.

7. A search assisting method comprising:
detecting a line-of-sight trajectory of an operator on an image displayed on a display;
extracting, on a basis of the line-of-sight trajectory detected by the detecting of the line-of-sight trajectory, a gaze region gazed by the operator in the image displayed on the display; and
determining, on a basis of a distance from a predetermined position measured by the measuring of the distance, a presence of a predetermined detection target in the gaze region,
wherein extracting the gaze region comprises extracting, from the image displayed on the display, a circular region as the gaze region, the circular region being a region in which an average position of the line-of-sight trajectory is defined as a center and in which probability of presence of the line-of-sight trajectory takes a predetermined value.

8. A non-transitory computer readable medium having a search assisting program, the search assisting program causing, when executed by a controller of a search assisting apparatus, the search assisting apparatus to:
detect a line-of-sight trajectory of an operator on an image displayed on a display that displays an image captured by a capturing unit;
extract, on a basis of the detected line-of-sight trajectory, a gaze region gazed by the operator in the image displayed on the display; and
determine, on a basis of a distance in the gaze region from a predetermined position measured by a ranging unit that measures a distance from the capturing unit, a presence of the detection target in the gaze region,
wherein extracting the gaze region comprises extracting, from the image displayed on the display, a circular region as the gaze region, the circular region being a region in which an average position of the line-of-sight trajectory is defined as a center and in which probability of presence of the line-of-sight trajectory takes a predetermined value.

* * * * *